(12) United States Patent
Bower et al.

(10) Patent No.: US 8,756,979 B2
(45) Date of Patent: Jun. 24, 2014

(54) MULTIFUNCTIONAL APPARATUS COMPRISING A SUPERLIQUIDPHOBIC SURFACE

(75) Inventors: Chris Bower, Ely (GB); Jani Kivioja, Cambridge (GB); Richard White, Huntingdon (GB); Antti Niskanen, Cambridge (GB)

(73) Assignee: Nokia Corporation, Espoo (FI)

( * ) Notice: Subject to any disclaimer, the term of this patent is extended or adjusted under 35 U.S.C. 154(b) by 301 days.

(21) Appl. No.: 13/333,207

(22) Filed: Dec. 21, 2011

(65) Prior Publication Data
US 2013/0160527 A1 Jun. 27, 2013

(51) Int. Cl.
*G01N 11/00* (2006.01)

(52) U.S. Cl.
USPC ........................................... 73/53.01

(58) Field of Classification Search
None
See application file for complete search history.

(56) References Cited

U.S. PATENT DOCUMENTS

| | | | |
|---|---|---|---|
| 4,142,724 A | 3/1979 | Reick | 273/109 |
| 6,332,322 B1 | 12/2001 | Tanaka | 62/3.7 |
| 6,379,929 B1 * | 4/2002 | Burns et al. | 435/91.2 |
| 6,660,363 B1 | 12/2003 | Barthlott | 428/141 |
| 2005/0115836 A1 * | 6/2005 | Reihs | 204/450 |
| 2007/0009657 A1 | 1/2007 | Zhang et al. | 427/180 |
| 2007/0075922 A1 * | 4/2007 | Jessop | 345/49 |

OTHER PUBLICATIONS

Jung et al., "Mechanically Durable Carbon Nanotube-Composite Hierarchical Structures with Superhydrophobicity, Self-Cleaning, and Low-Drag", Nanoprobe Laboratory for Bio-& Nanotechnology and Biometrics, vol. 3, No. 12 (2009), (pp. 4155-4163).
Krupenkin, et al., "Electrically Tunable Superhydrophobic Nanostructured Surfaces", Bell Labs Technical Journal 10(3), (2005), (pp. 161-170).
Roach, et al., "Progress in Superhydrophobic Surface Development", Soft Matter, The Royal Society of Chemistry (2008), (pp. 224-240).
Tuteja et al., "Designing Superoleophobic Surfaces", vol. 318, (Dec. 7, 2007), (pp. 1618-1622).

* cited by examiner

*Primary Examiner* — Peter Macchiarolo
*Assistant Examiner* — Alex Devito
(74) *Attorney, Agent, or Firm* — Harrington & Smith

(57) ABSTRACT

In accordance with an example embodiment of the present invention, apparatus including a position sensitive layer configured for position sensitivity; and a superliquidphobic layer configured for superliquidphobicity, the superliquidphobic layer positioned with a surface proximal to a surface of the position sensitive layer; wherein the position sensitive layer is configured to detect the position of a liquid droplet situated on a surface of the superliquidphobic layer.

18 Claims, 2 Drawing Sheets

MULTIFUNCTIONAL APPARATUS COMPRISING A SUPERLIQUIDPHOBIC SURFACE

TECHNICAL FIELD

The present application relates generally to superliquidphobic surfaces.

BACKGROUND

Superliquidphobic surfaces, including superhydrophobic surfaces, have numerous applications such as self-cleaning; drag reduction, and plastron capture. Many of these applications rely upon the ability of the surface to trap an air film at the surface, thus resulting in a large advancing contact angle. When the surface has very low contact angle hysteresis; liquids may be observed to roll across the surface in a similar motion to that of a glass marble.

SUMMARY

Various aspects of examples of the invention are set out in the claims.

According to a first aspect, the present invention provides an apparatus comprising: a position sensitive layer configured for position sensitivity; and a superliquidphobic layer configured for superliquidphobicity, the superliquidphobic layer positioned with a surface proximal to a surface of the position sensitive layer; wherein the position sensitive layer is configured to detect the position of a liquid droplet situated on a surface of the superliquidphobic layer.

The superliquidphobic layer may be a combination of one or more of a superhydrophobic layer and a superoleophobic layer.

The position sensitive layer may comprise a capacitive sensing layer; and the position sensitive layer is configured to detect the position of the liquid droplet, using changes in the detected fringing field of the capacitive sensing layer due to the liquid droplet being situated on a surface of the superliquidphobic layer.

The apparatus may comprise a Peltier cooler device located proximal to the superliquidphobic layer, wherein the Peltier cooler device may be configured to create the liquid droplet situated on a surface of the superliquidphobic layer.

The apparatus may be configured such that a liquid droplet is applied to a surface of the superliquidphobic layer from an external source.

The apparatus may comprise a display proximal to the position sensitive layer, the display comprising display pixels configured to emit light; and wherein the apparatus may be configured such that light passing from the display pixels through the liquid droplet is modulated by the liquid droplet. The superliquidphobic layer may be configured to transmit at least some of the light emitted by the pixels, through the superliquidphobic layer.

The apparatus may be configured to allow movement of the liquid droplet such that movement of the liquid droplet over a surface of the superliquidphobic layer causes the surface of the superliquidphobic layer to be cleaned, due to any dirt or contamination present on the surface of the superliquidphobic layer being picked up by the liquid droplet as it moves over the surface of the superliquidphobic layer.

The apparatus may be configured to allow movement of the liquid droplet over an electronic display of a puzzle such that the liquid droplet moves over a surface of the superliquidphobic layer in such a way as if to move through the displayed puzzle, the movement of the liquid droplet being controlled by a user interfacing with the apparatus. The liquid droplet may be one of a plurality of liquid droplets situated on a surface of the superliquidphobic layer.

According to a second aspect, the present invention provides a method comprising: providing a position sensitive layer configured for position sensitivity; applying a precursor mixture to the position sensitive layer; forming a superliquidphobic layer configured for superliquidphobicity, from the precursor mixture, on the position sensitive layer.

According to a third aspect, the present invention provides a method comprising: providing a position sensitive layer configured for position sensitivity; providing a superliquidphobic layer configured for superliquidphobicity, positioning the superliquidphobic layer with a surface proximal to a surface of the position sensitive layer; and configuring the position sensitive layer to detect the position of a liquid droplet situated on a surface of the superliquidphobic layer.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 4 of the drawings.

Superhydrophobic surfaces have numerous applications such as self-cleaning; drag reduction, and plastron capture. All of these applications rely upon the ability of the surface to trap an air film (a plastron) at a solid-liquid interface, thus resulting in a large advancing contact angle of >150 degrees. This situation, in which a stable air film occupies the surface, is often called a 'Cassie-Baxter' wetting state. When the receding contact angle is of similar magnitude to the advancing contact angle, so that the surface has very low contact angle hysteresis, liquids may readily dewet the surface, rolling off like liquid marbles and carrying dirt and contamination away from the surface.

In this invention, new uses are proposed for such superhydrophobic surfaces, in particular when combined with some existing capabilities of mobile devices. When a liquid droplet is placed onto a superhydrophobic surface, the drop is often extremely mobile, behaving essentially like a liquid marble, which has desirable effects such as self-cleaning, and extreme water resistance. However, it is suggested that further novel uses for such behaviour as a new kind of user interface for device interaction in the form of games, which combine virtual and physical aspects.

Figure 1:
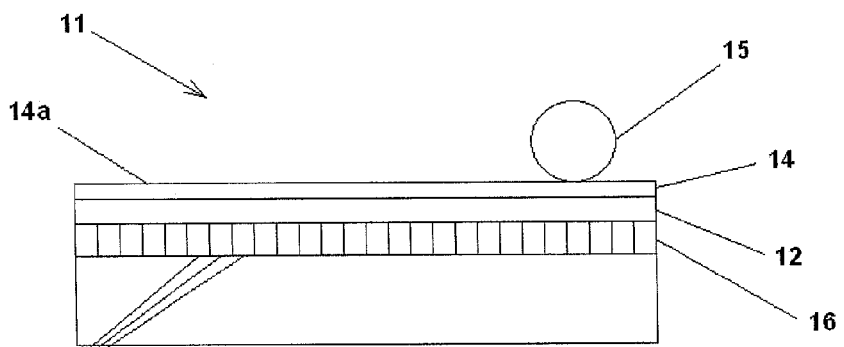
FIG. 1 shows a schematic diagram of an apparatus according to one aspect of the invention.

FIG. 1 shows a first schematic diagram of an apparatus 11 comprising a position sensitive layer 12, and a superhydrophobic layer 14 positioned adjacent to the position sensitive layer 12. The position sensitive layer 12, and superhydrophobic layer 14 are each configured such that the position sensitive layer 12 detects a position of a liquid droplet 15 situated on a surface 14a of the superhydrophobic layer 14. The apparatus 11 further comprises a display 16 proximal to the position sensitive layer, the display 16 comprising display pixels 17 configured to emit or modulate light. The apparatus is configured such that the light passing from the display pixels through the liquid droplet is modulated by the liquid droplet. The position sensitive layer 12 and superhydrophobic layer 14 are each is configured to transmit at least some of the light emitted by the display pixels 17, through the superhydrophobic layer.

The position sensitive layer 12 may, for example, comprise a capacitive sensing layer configured to detect the position of the liquid droplet 15, using changes in the detected fringing field of the capacitive sensing layer due to the liquid droplet 15 being situated on a surface of the superhydrophobic layer 14. The apparatus 11 may, for example, comprise a mobile phone, or another portable electronic device.

Figure 2:
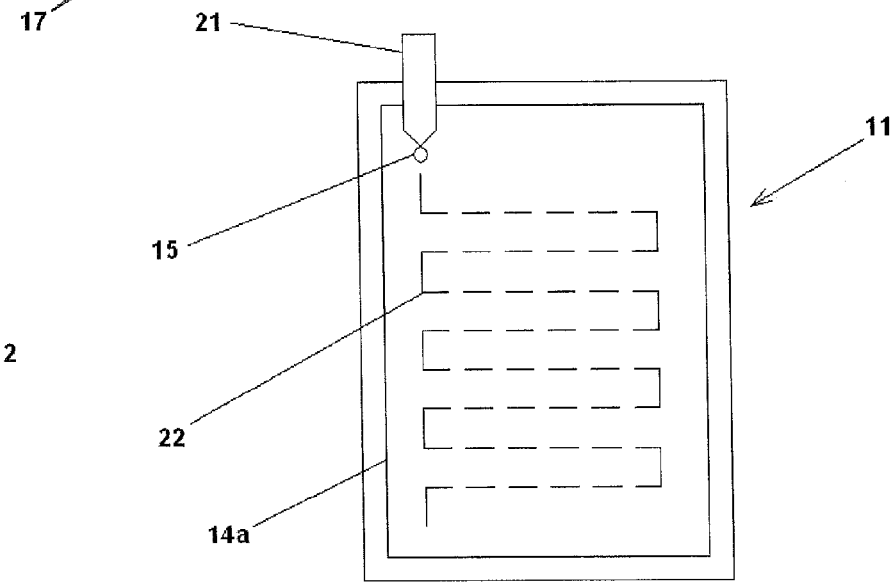
FIG. 2 shows a schematic diagram of an apparatus according to another aspect of the invention.

FIG. 2 shows a second schematic diagram of the apparatus 11 shown in FIG. 1. The apparatus 11 comprises a Peltier cooler device 21 located proximal to the superhydrophobic layer 14. The Peltier cooler device 21 is configured to create a liquid droplet 15 on the surface of the superhydrophobic layer (which in this example is a water droplet). The Peltier cooler device 21 employs the Peltier effect to cool part of the device 21 to cause condensation of water vapour in the air, to form the droplet 15, situated on a surface 14a of the superhydrophobic layer 14. In a further embodiment the Peltier cooler device may be located within the body of the apparatus 11 in a location that does not obscure the display 16, or may be located beneath the display 16, so that cooling of a small region of the surface 14a of the hydrophobic layer 14 allows condensation of the liquid droplet 15. The droplet 15 could, in another example, be formed by being applied to the surface of the superhydrophobic layer from an external source, such as a pipette.

The droplet 15, shown in FIG. 2, is moved across the surface 14a of the superhydrophobic layer 14. This may be done in order to clean the superhydrophobic layer 14, to remove dirt and contamination present on the surface 14a of the superhydrophobic layer 14. Dirt and contamination may be picked up by and trapped in the liquid droplet 15, as it moves over the surface 14a of the superhydrophobic layer 14. The user can tilt the apparatus 11 in one direction, and then another, to make the droplet 15 move, under the influence of gravity. A path 22 may be depicted on the display 16, to help ensure that every part of the surface 14a, is cleaned by the mobile droplet 15, in this way.

The apparatus 11 of FIGS. 1 and 2 can also be configured to allow movement of a liquid droplet over an electronic display of the apparatus. In this way a user may use the droplet's motion to solve a puzzle, a design 31, for which is shown schematically in FIG. 3. The puzzle's design 31 is depicted on the display 16, and the droplet 15 is moved over the superhydrophobic surface 14a by a user, who tilts the apparatus 11 one way, and then another, in such a way as if to move the droplet through the displayed puzzle, To complete the puzzle the droplet 15 should follow the puzzle's design 31, without moving onto the rest of the display 16.

It will be appreciated that more than one liquid droplet may be situated on the surface of the superhydrophobic layer in the above examples.

Figure 3:
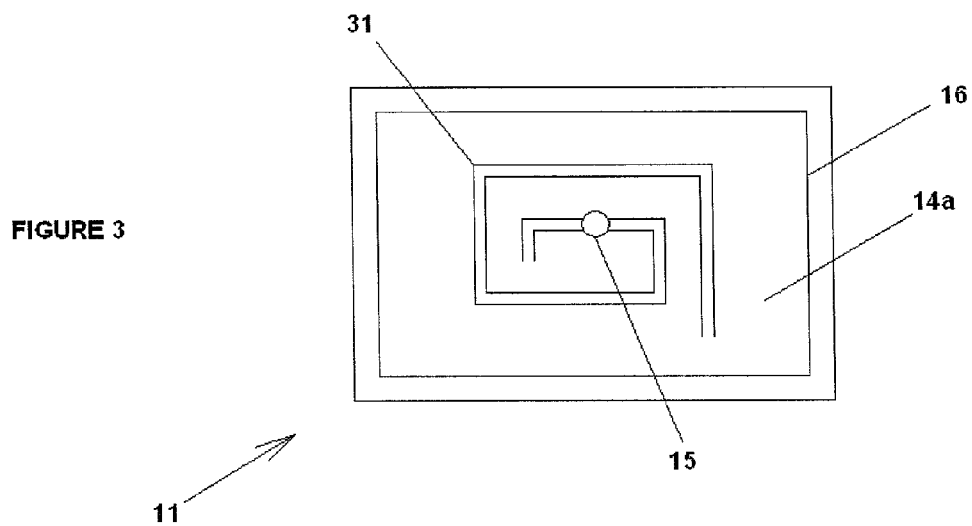
FIG. 3 shows a schematic diagram of an apparatus according to a yet further aspect of the invention.

Examples illustrated in FIGS. 1-3 relate to a superhydrophobic material. It will be appreciated that the use of a superoleophobic layer, with an oil-based droplet rather than a liquid droplet, may also be used.

Figure 4:
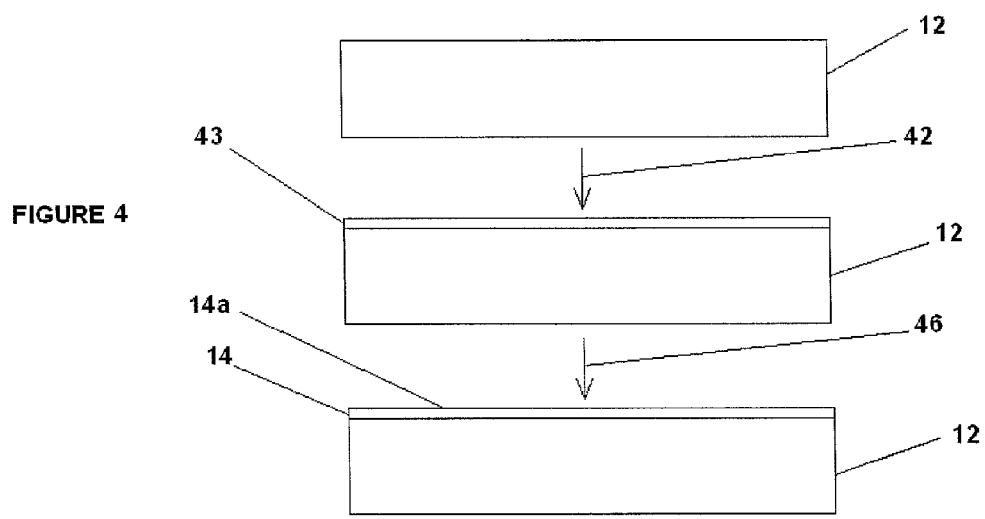
FIG. 4 is a flow diagram showing operations for fabricating an apparatus shown in FIGS. 1 to 3.

The superhydrophobic layer 14 may comprise a superhydrophobic material deposited on position sensitive layer 12 by a process described in US 2007 009657, and shown schematically in FIG. 4. The superhydrophobic layer 14 may be fabricated by applying, at 42, a precursor mixture 43 comprising a particulate, a linking agent, and peroxide or a catalyst to the position sensitive layer (configured for position sensitivity) to form the superhydrophobic layer on the surface of the position sensitive layer. The catalyst may be a tin or zinc catalyst.

The linking agent is configured to form, at 46, in FIG. 4, polymer strands linking particles from the particulate, and to link the position sensitive layer 12 to the particles from the particulate. The mixture 43 may comprise a peroxide that is configured to cause a peroxide catalysed cross-linking reaction between polymer strands formed by the linking agent. The particulate may be selected from, but is not limited to, the group: silica particles, alumina particles, particles of cementitious material, metal particles, glass particles, particles of a metal oxide, and mixtures thereof. The particles of the particulate material may have an average particle size from: 1 nm to 500 µm. The particles of the particulate material may have an average particle size from: 1 nm-100 nm.

The linking agent may be a polymer or mixture of polymers selected from the group consisting of modified polystyrene, polyethylenes, polyurethanes, polycarbonates, fluorinated polymers, and triethoxysilyl modified poly-1,2-butadiene. Alternatively, the linking agent may be a bifuntional or trifunctional alkylsilane. The linking agent may comprise a polymer having terminal vinyl groups selected from the group consisting of vinyl terminated polydimethylsiloxane, vinyl terminated diphenylsiloxane-dimethylsiloxane copolymer, vinyl terminated trifluoropropylmethylsiloxane-dimethylsiloxane copolymer, vinylmethyloxysiloxane homopolymer and mixtures thereof. The linking agent may comprise a polymer or mixture of polymers selected from the group consisting of hydroxy terminated vinylsiloxane polymer, hydroxy terminated polydimethylsiloxane, hydroxy terminated polydiphenylsiloxane, hydroxy terminated polyphenylmethylsiloxane, methylhydrosiloxane (and copolymers with dimethylsiloxane), vinylmethoxysiloxane homopolymer, polytrifluoropropylmethylsiloxane (silanol terminated), vinylmethylsiloxane-dimethylsiloxane copolymer (silanol terminated) and vinylmethylsiloxanes.

Prior to application of the mixture, at 42, in FIG. 4, a platinum catalyst may be applied to the position sensitive layer 12, the platinum catalyst configured to catalyse a vinyl addition cross-linking reaction to cross-link polymer strands formed by the linking agent. Prior to application of the mixture, at 42, in FIG. 4 a catalyst comprising dibutyltin dilaurate or zinc octoate may be applied to the position sensitive layer 12. The platinum catalyst may be selected from the group consisting of platinum divinyl complexes, platinum cyclovinyl complexes, and mixtures thereof.

The fabrication process comprises heating the coating, at 46, in FIG. 4, to a temperature and for a period of time effective for the linking agent to form polymer strands linking two or more particles of the particulate material, and to form polymer strands linking the surface and one or more particles of the particulate material, thereby linking the particles together and to the surface by polymer strands. The heating, at 46, in FIG. 4, may comprise heating to a temperature of up to 150° C. for a period of time effective for at least some of the polymer strands to become cross-linked.

In a further embodiment the superhydrophobic layer 14 may also be a substantially transparent film that can be attached using optically clear adhesive to the front of the display of a mobile device, so that when the nano-structured surface becomes damaged or worn, it can be replaced with another Superhydrophobic layer.

Without in any way limiting the scope, interpretation, or application of the claims appearing below, a technical effect of one or more of the example embodiments disclosed herein is to clean a display. Another technical effect of one or more of the example embodiments disclosed herein is to provide a new type of user interface, which uses a liquid droplet to control interaction with an apparatus. Another technical effect of one or more of the example embodiments disclosed herein is to provide a convenient way to generate a water droplet for use in a new type of user interface.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
   a position sensitive layer configured for position sensitivity;
   a superliquidphobic layer configured for superliquidphobicity, the superliquidphobic layer positioned with a surface proximal to a surface of the position sensitive layer; and
   a Peltier cooler device located proximal to the superliquidphobic layer;
   wherein the position sensitive layer is configured to detect the position of a liquid droplet situated on a surface of the superliquidphobic layer;
   wherein the Peltier cooler device is configured to create the liquid droplet situated on a surface of the superliquidphobic layer.

2. The apparatus of claim 1, wherein the superliquidphobic layer is a combination of one or more of a superhydrophobic layer and a superoleophobic layer.

3. The apparatus of claim 1, wherein:
   the position sensitive layer comprises a capacitive sensing layer; and
   the position sensitive layer is configured to detect the position of the liquid droplet, using changes in the detected fringing field of the capacitive sensing layer due to the liquid droplet being situated on a surface of the superliquidphobic layer.

4. The apparatus of claim 1, wherein the apparatus is configured such that a liquid droplet is applied to a surface of the superliquidphobic layer from an external source.

5. The apparatus of claim 1, the apparatus comprising a display proximal to the position sensitive layer, the display comprising display pixels configured to emit light; and wherein the apparatus is configured such that light passing from the display pixels through the liquid droplet is modulated by the liquid droplet.

6. An apparatus according to claim 5 where in the superliquidphobic layer is configured to transmit at least some of the light emitted by the pixels, through the superliquidphobic layer.

7. The apparatus of claim 1, wherein the apparatus is configured to allow movement of the liquid droplet such that movement of the liquid droplet over a surface of the superliquidphobic layer causes the surface of the superliquidphobic layer to be cleaned, due to any dirt or contamination present on the surface of the superliquidphobic layer being picked up by the liquid droplet as it moves over the surface of the superliquidphobic layer.

8. The apparatus of claim 1, wherein the apparatus is configured to allow movement of the liquid droplet over an electronic display of a puzzle such that the liquid droplet moves over a surface of the superliquidphobic layer in such a way as if to move through the displayed puzzle, the movement of the liquid droplet being controlled by a user interfacing with the apparatus.

9. The apparatus of claim 1 wherein the liquid droplet is one of a plurality of liquid droplets situated on a surface of the superliquidphobic layer.

10. A method comprising:
    providing a position sensitive layer configured for position sensitivity;
    applying a precursor mixture to the position sensitive layer;
    forming a superliquidphobic layer configured for superliquidphobicity, from the precursor mixture, on the position sensitive layer;
    providing a Peltier cooler device;
    using the Peltier cooler device, creating a liquid droplet situated on a surface of the superliquidphobic layer; and
    detecting a position of the liquid droplet situated on a surface of the superliquidphobic layer.

11. The apparatus of claim 1, wherein the superliquidphobic layer comprises a precursor mixture comprising a particulate, a linking agent, and peroxide or a catalyst.

12. The apparatus of claim 11, wherein the catalyst is tin, zinc, platinum, dibutyltin dilaurate, or zinc octoate.

13. The apparatus of claim 11, wherein the linking agent is configured to form polymer strands that link the particulate to the position sensitive layer.

14. The apparatus of claim 11, wherein the particulate is selected from the group consisting of silica particles, alumina particles, particles of cementitious material, metal particles, glass particles, particles of metal oxide, and mixtures of the foregoing particles.

15. The apparatus of claim 11, wherein the linking agent is a polymer or mixture of polymers selected from the group consisting of polystyrene, polyethylenes, polyurethanes, polycarbonates, fluoridated polymers, and triethylsilyl modified poly-1,2-butadiene.

16. The apparatus of claim 11, wherein the linking agent is a bifunctional alkylsilane or a trifunctional alkylsilane.

17. The apparatus of claim 11, wherein the linking agent comprises a polymer having terminal vinyl groups.

18. The apparatus of claim 1, wherein the apparatus is a portable electronic device.

* * * * *